United States Patent
Sakamoto et al.

(10) Patent No.: US 11,973,182 B2
(45) Date of Patent: Apr. 30, 2024

(54) SLURRY FORMULATION FOR THE FORMATION OF LAYERS FOR SOLID STATE BATTERIES

(71) Applicants: The Regents of the University of Michigan, Ann Arbor, MI (US); Board of Trustees of Michigan State University, East Lansing, MI (US)

(72) Inventors: Jeffrey Sakamoto, Ann Arbor, MI (US); Travis Thompson, Ann Arbor, MI (US); Isabel N. Boona, Worthington, OH (US)

(73) Assignees: The Regents of the University of Michigan, Ann Arbor, MI (US); Board of Trustees of Michigan State University, East Lansing, MI (US)

( * ) Notice: Subject to any disclaimer, the term of this patent is extended or adjusted under 35 U.S.C. 154(b) by 363 days.

(21) Appl. No.: 16/914,792

(22) Filed: Jun. 29, 2020

(65) Prior Publication Data

US 2020/0335816 A1 Oct. 22, 2020

Related U.S. Application Data

(62) Division of application No. 15/383,286, filed on Dec. 19, 2016, now Pat. No. 10,700,378.

(Continued)

(51) Int. Cl.
*H01M 10/0562* (2010.01)
*B05D 1/26* (2006.01)
(Continued)

(52) U.S. Cl.
CPC ...... *H01M 10/0562* (2013.01); *C01G 25/006* (2013.01); *H01M 4/0402* (2013.01); *H01M 4/0404* (2013.01); *H01M 4/0471* (2013.01);

*H01M 4/13* (2013.01); *H01M 4/139* (2013.01); *H01M 4/505* (2013.01); *H01M 4/525* (2013.01); *H01M 10/0585* (2013.01); *B05D 1/26* (2013.01);
(Continued)

(58) Field of Classification Search
None
See application file for complete search history.

(56) References Cited

U.S. PATENT DOCUMENTS 5,338,625 A 8/1994 Bates et al.
5,569,694 A * 10/1996 Kuhm .................... C08K 5/098
524/400

(Continued)

FOREIGN PATENT DOCUMENTS

WO 2004030131 A2 4/2004
WO 2013131005 A2 9/2013

OTHER PUBLICATIONS

Anandan, et al., Fabrication and Testing of Bulk-Type Solid State Batteries Based on a Garnet Oxide Electrolyte, 228th ECS Meeting, 2015, No. 235.

(Continued)

*Primary Examiner* — Haroon S. Sheikh
(74) *Attorney, Agent, or Firm* — Quarles & Brady LLP

(57) ABSTRACT

Disclosed are electrochemical devices, such as lithium ion battery electrodes, lithium ion conducting solid-state electrolytes, and solid-state lithium ion batteries including these electrodes and solid-state electrolytes. Also disclosed are methods for making such electrochemical devices.

19 Claims, 3 Drawing Sheets

Related U.S. Application Data

(60) Provisional application No. 62/268,545, filed on Dec. 17, 2015.

(51) Int. Cl.

| | | |
|---|---|---|
| *B05D 1/30* | (2006.01) | |
| *C01G 25/00* | (2006.01) | |
| *H01M 4/02* | (2006.01) | |
| *H01M 4/04* | (2006.01) | |
| *H01M 4/13* | (2010.01) | |
| *H01M 4/139* | (2010.01) | |
| *H01M 4/505* | (2010.01) | |
| *H01M 4/525* | (2010.01) | |
| *H01M 10/0585* | (2010.01) | |

(52) U.S. Cl.
CPC ......... *B05D 1/30* (2013.01); *H01M 2004/028* (2013.01); *H01M 2300/0068* (2013.01); *H01M 2300/0071* (2013.01); *H01M 2300/0091* (2013.01)

(56) References Cited

U.S. PATENT DOCUMENTS

| | | | |
|---|---|---|---|
| 5,922,486 | A | 7/1999 | Chiao |
| 6,228,520 | B1 | 5/2001 | Chiao |
| 7,569,304 | B2 | 8/2009 | Irvine et al. |
| 8,962,195 | B2 | 2/2015 | Shizuka et al. |
| 9,039,788 | B2 | 5/2015 | Xu et al. |
| 9,077,038 | B2 | 7/2015 | Halalay et al. |
| 9,093,717 | B2 | 7/2015 | Sakamoto et al. |
| 9,115,005 | B2 | 8/2015 | Okada et al. |
| 9,136,568 | B2 | 9/2015 | Visco et al. |
| 9,190,658 | B2 | 11/2015 | Ryu et al. |
| 9,236,158 | B2 | 1/2016 | Kubo et al. |
| 9,246,161 | B2 | 1/2016 | Ueno et al. |
| 9,257,702 | B2 | 2/2016 | Sugiura et al. |
| 2002/0031710 | A1 | 3/2002 | Kezuka et al. |
| 2004/0247970 | A1 | 12/2004 | Irvine et al. |
| 2009/0092903 | A1 | 4/2009 | Johnson et al. |
| 2013/0316264 | A1 | 11/2013 | Liu et al. |
| 2013/0344416 | A1 | 12/2013 | Sakamoto et al. |
| 2014/0099538 | A1 | 4/2014 | Johnson et al. |
| 2014/0377665 | A1 | 12/2014 | Yoshida et al. |
| 2015/0056519 | A1* | 2/2015 | Ohta .................. H01M 4/5825 264/618 |
| 2015/0099188 | A1* | 4/2015 | Holme ................ C04B 35/486 429/231.95 |
| 2017/0155169 | A1 | 6/2017 | Hitz et al. |

OTHER PUBLICATIONS

David, Ceramic Processing of a Garnet-Based Superionic Conducting Oxide: Lithium Lanthanum Zirconium Aluminate, Thesis Submitted to Michigan State University, 2014.

Lim, Low Temperature Co-Fired Ceramics Technology for Power Magnetics Integration, Dissertation Submitted to Virginia Polytechnic Institute and State University, 2008.

Rangasamy, et al., The Role of Al and Li Concentration on the Formation of Cubic Garnet Solid Electrolyte of Nominal Composition Li7La3Zr2O12, Solid State Ionics, 2011.

Tadanaga, et al., Low Temperature Synthesis of Highly Ion Conductive Li7La3Zr2O12-Li3BO3 Composites, Electrochemistry Communications, 2013, 33:51-54.

Takano, et al., Low Temperature Synthesis of Al-doped Li7La3Zr2O12 Solid Electrolyte by a Sol-Gel Process, Solid State Ionics, 2014, 255:104-107.

Tan, et al., Synthesis of Cubic Phase Li7La3Zr2O12 Electrolyte for Solid-State Lithium-Ion Batteries, Electrochemical and Solid-State Letters, 2012, 15(3):A37-A39.

PCT International Search Report and Written Opinion, PCT/US2016/067455, dated Apr. 27, 2017.

\* cited by examiner

SLURRY FORMULATION FOR THE FORMATION OF LAYERS FOR SOLID STATE BATTERIES

CROSS-REFERENCES TO RELATED APPLICATIONS

This application is a divisional application of U.S. patent application Ser. No. 15/383,286 filed Dec. 19, 2016, which claims priority from U.S. Patent Application No. 62/268,545 filed Dec. 17, 2015.

STATEMENT REGARDING FEDERALLY SPONSORED RESEARCH

This invention was made with government support under W911NF-13-1-0475 awarded by the U.S. Army Research Office. The government has certain rights in the invention.

BACKGROUND OF THE INVENTION

1. Field of the Invention

This invention relates to electrochemical devices, such as lithium ion battery electrodes, lithium ion conducting solid-state electrolytes, and solid-state lithium ion batteries including these electrodes and solid-state electrolytes. This invention also relates to methods for making such electrochemical devices.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to $Li^+$ ions and can offer 3-4 times the energy density while reducing the battery pack cost by about 20%. Despite these attractive features, the fabrication and testing of solid state batteries for bulk scale applications, such as electric vehicles, has not been demonstrated. The primary challenge associated with solid state batteries is the development of new manufacturing techniques for thin ceramic layers and the assembly of these layers into new cell architectures.

Therefore, what is needed are methods and slurry formulations for the fabrication of thin ceramic layers for solid state battery applications.

SUMMARY OF THE INVENTION

The present invention provides methods and formulations for the fabrication of solid-state batteries, such as lithium ion solid state batteries.

In one aspect, the invention provides a method for forming a lithium ion conducting solid-state electrolyte. The method includes the steps of: (a) casting a slurry on a surface to form a layer; and (b) sintering the layer to form the solid-state electrolyte, wherein the slurry comprises a solid electrolyte material and a dispersant providing a source of lithium ions.

In another aspect, the invention provides a method for forming a lithium ion conducting solid-state electrolyte. The method includes the steps of: (a) casting a slurry on a surface to form a layer; and (b) sintering the layer to form the solid-state electrolyte, wherein the slurry comprises a solid electrolyte material having an excess of lithium ions.

In the methods for forming a lithium ion conducting solid-state electrolyte, the solid electrolyte material can be any combination oxide or phosphate materials with the garnet, perovskite, NaS ICON, or LiSICON phase. The garnet phase can have the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, V, Bi, Ge, and Si; A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; and y can vary from 11-12.5. The garnet can be lithium lanthanum zirconium oxide having the formula $Li_{6.25}La_3Zr_2Al_{0.25}O_{12}$ (LLZO) which is a ceramic oxide that exhibits the combination of high ionic conductivity ($4 \times 10^{-4}$ S/cm at room temperature) and chemical stability against metallic lithium.

In another aspect, the invention provides a method for forming an electrode for an electrochemical device. The method includes the steps of: (a) casting a slurry on a surface to form a layer; and (b) sintering the layer to form the electrode, wherein the slurry comprises a lithium host material and a dispersant providing a source of lithium ions.

In another aspect, the invention provides a method for forming an electrochemical device. The method includes the steps of: (a) casting a first slurry on a surface to form a first layer, wherein the first slurry comprises a first lithium host material; (b) casting a second slurry on the first layer to form a second layer on the first layer, wherein the second slurry comprises a solid electrolyte material and a dispersant providing a source of lithium ions; (c) casting a third slurry on the second layer to form a third layer on the second layer thereby creating a layered structure of the first layer, the second layer and the third layer, wherein the third slurry comprises a second lithium host material; and (d) sintering the layered structure to form the electrochemical device. The sintered first layer of the sintered layered structure can be one of the anode and the cathode of the electrochemical device, and the sintered third layer of the sintered layered structure can be the other of the anode and the cathode of the electrochemical device. The sintered second layer of the sintered layered structure can be the solid state electrolyte between the anode and cathode of the electrochemical device. The casting surface of the first slurry can be a surface of a current collector of the electrochemical device.

In another aspect, the invention provides a method for forming an electrochemical device. The method includes the steps of: (a) casting a first slurry on a surface to form a first layer, wherein the first slurry comprises a first lithium host material; (b) casting a second slurry on the first layer to form a second layer on the first layer, wherein the second slurry comprises a solid electrolyte material having an excess of lithium ions; (c) casting a third slurry on the second layer to form a third layer on the second layer thereby creating a layered structure of the first layer, the second layer and the third layer, wherein the third slurry comprises a second lithium host material; and (d) sintering the layered structure to form the electrochemical device. The sintered first layer of the sintered layered structure can be one of the anode and the cathode of the electrochemical device, and the sintered third layer of the sintered layered structure can be the other of the anode and the cathode of the electrochemical device. The sintered second layer of the sintered layered structure can be the solid state electrolyte between the anode and cathode of the electrochemical device. The casting surface of the first slurry can be a surface of a current collector of the electrochemical device.

In another aspect, the invention provides a slurry for forming a lithium ion conducting solid-state electrolyte. The slurry comprises a solid electrolyte material as described above (with lithium lanthanum zirconium oxide, preferably $Li_{6.25}La_3Zr_2Al_{0.25}O_{12}$ (LLZO) being a non-limiting example), and a dispersant providing a source of lithium ions. The slurry can be sintered to form a ceramic layer suitable for use as a lithium ion conducting solid-state electrolyte in an electrochemical device, such as a lithium ion solid state battery.

In another aspect, the invention provides a slurry for forming an electrode for an electrochemical device. The slurry comprises a lithium host material, and a dispersant providing a source of lithium ions. The slurry can be sintered to form a ceramic layer suitable for use as an anode or cathode in an electrochemical device, such as a lithium ion solid state battery.

A solid state battery fabricated using the methods and formulations of the invention has many advantages. For example, a solid state battery fabricated using the methods and formulations of the invention is safer than a liquid electrolyte battery (i.e., it is non-flammable); a solid state battery fabricated using the methods and formulations of the invention offers higher energy density; a solid state battery fabricated using the methods and formulations of the invention reduces battery cost (e.g., simpler packaging is used); and a solid state battery fabricated using the methods and formulations of the invention allows ceramics to be used in various architectures.

These and other features, aspects, and advantages of the present invention will become better understood upon consideration of the following detailed description, drawings and appended claims.

DETAILED DESCRIPTION OF THE INVENTION

The present invention provides methods and slurry formulations for the fabrication of thin ceramic layers suitable for use in a solid state battery. A slurry formulation of the invention may include: (i) one or more active battery materials (e.g., lithium lanthanum zirconium oxide as a component of a solid electrolyte, or lithium host materials for the anode or cathode of a lithium ion battery); (ii) one or more binders; (iii) one or more dispersants (used to prevent suspended powders such as the active battery materials from settling); (iv) one or more plasticizers (for increasing the workability of the cast tape); (v) one or more sintering aids (i.e., a material added to the system that melts before other components in liquid phase sintering to cause grains to rearrange into a more favorable packing arrangement and provide attraction between the grains through capillary action; and (vi) one or more solvents. The slurry components are mixed and a layer is cast which is then sintered forming a ceramic layer suitable for use in a solid state battery.

The slurry formulation of the invention is tailored for solid state batteries by addressing the problem of lithium volatility in the slurry during sintering. A change in the material formulation from the loss of lithium can lead to negative consequences for battery performance (especially when using LLZO as the electrolyte). In one version of the method of the invention, excess lithium is added to the system to account for lithium loss. Lithium boron oxide may be used as the sintering aid; however, instead of directly adding lithium boron oxide, a precursor (e.g., a source of borate ions such as a boron containing alkoxide including tri-isopropyl borate) can be added and the precursor forms lithium boron oxide from the excess lithium.

Figure 1:
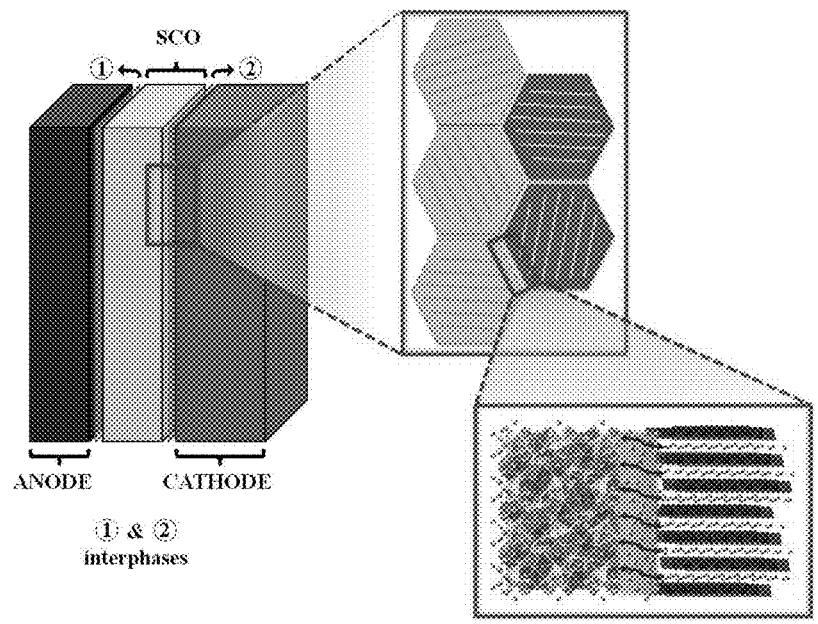
FIG. 1 is a schematic demonstrating a solid state battery which can be formed using the slurry formulations of the present invention.

When forming a solid electrolyte or an anode or a cathode, the slurry components are mixed until uniform and then a layer is cast. The thickness of the cast layer can be controlled, and layers 10-150 microns in thickness are suitable for a solid electrolyte or an anode or a cathode of a solid state battery. Subsequent layers can be cast on top of one another. For example, the anode can be cast first, followed by the electrolyte, and finally the cathode. Alternatively, the cathode can be cast first, followed by the electrolyte, and finally the anode. These cast layers can be processed individually or as a unit such that a solid-state battery is formed. FIG. 1 shows a schematic demonstrating a solid state battery which can be formed using the slurry formulations of the present invention.

Slurry formulations of the invention can be utilized in a low temperature co-fired ceramics process. Additional constraints, not present in related fields, must be considered with electrochemical applications such as a solid state battery. Primarily, many solid state battery materials contain a large fraction of the element lithium, which is volatile at the high temperatures required for sintering. The loss of lithium, and thus change in the battery material formulation, will have negative consequences for the performance of the battery. This is especially true for solid electrolytes such as LLZO. Thus, any means of achieving a dense layer (i.e., sintering) at a lower temperature will help to alleviate the lithium loss problem. The slurry formulation described herein has been tailored to, among other things, specifically address lithium loss during sintering.

Each component of a slurry formulation of the invention (i.e., active battery material, sintering aid, dispersant, plasticizer, binder, and solvent) is discussed below.

Active Battery Materials—Depending on whether the slurry formulation of the invention is being used fabricate a solid electrolyte or an anode or a cathode, the active battery materials may be: (i) a component of a solid electrolyte, or (ii) lithium host materials for the anode or cathode of a lithium ion battery. The active battery materials may be particles. The suitable particles may have an average diameter of 1 nanometer to 500 micrometers. The particles may have any suitable shapes, including spherical. In another embodiment, the suitable particles may have more than one shape.

A suitable solid electrolyte active material is Li-ion fast conducting materials. The solid electrolyte can be any combination oxide or phosphate materials with the garnet, perovskite, NaSICON, or LiSICON phase. The garnet phase can have the formula $Li_u Re_v M_w A_x O_y$, wherein Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, V, Bi, Ge, and Si; A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; and y can vary from 11-12.5. The garnet can be lithium lanthanum zirconium oxide having the formula $Li_{6.25}La_3Zr_2Al_{0.25}O_{12}$ (LLZO). Disadvantages associated with the degradation of liquid electrolytes can be eliminated if a solid electrolyte is used. To match or exceed the current ionic conductivity values of a liquid electrolyte, solid electrolytes need to be near theoretical density and be thermally and chemically stable in air and against metallic lithium. The formation of lithium dendrites in the solid electrolyte after charging cycles should be minimized or eliminated. High-density solid electrolytes can be produced through optimization of the slurry sintering conditions, i.e., time, temperature, pressure, atmosphere and chemical composition. Ceramic powder processing optimization of the sintering temperature and sintering mechanism has been shown here to increase the density as well as the Li-ion conductivity in the garnet lithium lanthanum zirconium oxide electrolyte $Li_{6.25}La_3Zr_2Al_{0.25}O_{12}$ (LLZO). See FIG. 4.

A suitable cathode active material is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNixCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials.

A suitable anode active material is a lithium host material capable of incorporating and subsequently releasing the lithium ion such as graphite, lithium metal, lithium titanium oxide, hard carbon, a tin/cobalt alloy, or silicon/carbon.

Sintering Aid—Sintering aids which melt and form a liquid can assist in sintering of a cast slurry formulation of the invention via liquid phase sintering. In one version of the slurry formulation of the invention, the sintering aid provides a source of borate ions. In another version of the slurry formulation of the invention disclosure, the sintering aid provides a source of phosphate ions. In another version of the slurry formulation of the invention disclosure, the sintering aid provides a source of silicate ions. In another version of the slurry formulation of the invention disclosure, the sintering aid provides a source of aluminate ions. Example sintering aids can be selected from boric acid, boric acid salts, boric acid esters, boron alkoxides phosphoric acid, phosphoric acid salts, phosphate acid esters, silicic acid, silicic acid salts, silanols, silicon alkoxides, aluminum alkoxides and mixtures thereof that assist in the formation of lithium boron oxide (LBO), lithium phosphate, lithium silicate, and lithium aluminum oxide phases. For example, excess lithium reacts with the sintering aid to form a lithium borate phase in-situ between the LLZO grains during heating. In the method described herein, a liquid source of the sintering aid (e.g., tri-isopropyl borate as a source of borate ions) can be included in the slurry formulation. Since the source of borate ions is a liquid, it uniformly and conformally coats the active battery materials in the slurry thereby forming the interphase layers 1 & 2 shown in FIG. 1 upon sintering. In the case of LLZO, excess lithium is added to the system to account for the lithium loss that occurs during high temperature processing. The excess lithium acts as a source to form the LBO phase from the source of borate ions (e.g., tri-isopropyl borate). An LLZO having an excess of lithium ions can provide the lithium ions needed to react with the source of borate ions to form the LBO phase.

Dispersant—The slurry formulation includes a dispersant. One purpose of the dispersant is to stabilize the slurry and prevent the suspended active battery material particles from settling out. The dispersant can also provide a source of lithium ions that is needed to react with the sintering aid. In the slurry formulation, the dispersant chosen contains lithium ions and is soluble in the solvent. This means that the dispersant can stabilize the particles in the slurry during casting and also act as a source of lithium ions when the temperature is increased after the cast tape is dried. The dispersant may be selected from the group consisting of salts of lithium and a fatty acid. The fatty acid may be selected from lauric acid, myristic acid, palmitic acid, stearic acid, oleic acid, linoleic acid, linolenic acid, arachidic acid, and behenic acid. In one non-limiting example slurry formulation of the present disclosure, the dispersant is lithium stearate.

Plasticizer—The slurry formulation may include a plasticizer. The purpose of the plasticizer is to increase the workability of the as-cast tape. Preferably, the plasticizer is a naturally derived plant based oil. The plasticizer may be selected from the group consisting of coconut oil, castor oil, soybean oil, palm kernel oil, almond oil, corn oil, canola oil, rapeseed oil, and mixtures thereof. Although a petroleum derivative could also be used for the plasticizer, the choice of a plant oil is sustainable. The plasticizer was also chosen to reduce the evaporation rate of the solvent and increase the mechanical ductility of the slurry after drying. In one non-limiting example slurry formulation of the present disclosure, coconut oil was used for the plasticizer.

Binder—The slurry formulation may include a binder. Non-limiting examples of the binder include: poly(methylmethacrylate), poly(vinylacetate), polyvinyl alcohol, polyethyleneoxide, polyvinylpyrrolidone, polyvinyl ether, polyvinylchloride, polyacrylonitrile, polyvinylpyridine, styrene-butadiene rubber, acrylonitrile-butadiene rubber, polyethylene, polypropylene, ethylene-propylene-diene terpolymers (EPDM), cellulose, carboxymethylcellulose, starch, hydroxypropylcellulose, and mixtures thereof. The binder is preferably a non-fluorinated polymeric material. Fluorinated polymers, such as polytetrafluoroethylene (Teflon®) and polyvinylidene fluoride, are often used as binders in current Li-ion batteries. However, unlike current Li-ion batteries, the cast ceramic layers of the present invention will be sintered. The elevated temperatures and the presence of fluorine in the polymers results in the unavoidable formation of the compound LiF and deterioration of the performance of the battery. In one non-limiting example slurry formulation of the present disclosure, an acrylic polymer, poly(methylmethacrylate), was chosen since these polymers leave behind little to no residue when heated.

Solvent—A solvent is useful in a slurry formulation to dissolve the binder and act as a medium for mixing the other additives. Any suitable solvents may be used for mixing the active battery material particles, dispersant, and binder into a uniform slurry. Suitable solvents may include alkanols (e.g., ethanol), nitriles (e.g., acetonitrile), alkyl carbonates, alkylene carbonates (e.g., propylene carbonate), alkyl acetates, sulfoxides, glycol ethers, ethers, N-methyl-2-pyrrolidone, dimethylformamide, dimethylacetamide, tetrahydrofuran, or a mixture of any of these solvents. For one non-limiting example slurry formulation, a mixture of two solvents was chosen. First, a solvent was chosen to dissolve the binder and the dispersant. However, it was found, through developing the slurry, that the evaporation rate of this solvent may be too fast and a sub-optimal cast slurry tape resulted. A second solvent was added and the ratio of plasticizer was varied to tune the evaporation rate and resulting cast slurry tape. In one non-limiting example slurry formulation of the present disclosure, a mixture of ethanol and acetonitrile was used for the solvent.

Other Additives—The slurry formulation may include other additives. For example, the cathode or anode active battery material particles may be mixed with other particles, such as conductive particles. Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as aluminum powder and nickel powder; conductive whiskers such as zinc oxide and potassium titanate; conductive metal oxides such as titanium oxide; and polyphenylene derivatives.

Any suitable method may be used to mix the active battery material particles and/or other particles with the sintering aid, plasticizer, binder and solvent into a uniform slurry. Suitable mixing methods may include sonication, mechanical stirring, physical shaking, vortexing, ball milling, and any other suitable means.

After the uniform slurry is obtained, the formulation is cast on a substrate surface to form a cast tape layer. The substrate may include any stable and conductive metals suitable as a current collector for the battery. A suitable metallic substrate may include aluminum, copper, silver, iron, gold, nickel, cobalt, titanium, molybdenum, steel, zirconium, tantalum, and stainless steel. In one embodiment, the metal substrate is aluminum.

The slurry layer cast on the surface may have a thickness in the range of a few micrometers to a few centimeters. In one embodiment, the thickness of the cast slurry layer is in the range of 10 micrometers to 150 micrometers, preferably 10 micrometers to 100 micrometers, more preferably 10 micrometers to 50 micrometers.

After the slurry is cast on the substrate surface to form a tape, the green tape can be dried and sintered at a temperature in a range of 300° C. to 1200° C., more preferably 600° C. to 1000° C. to achieve the necessary electrochemical properties. Optionally, multiple layers can be cast on top of one another. For example, the anode can be cast first on the metal substrate, followed by casting the electrolyte on the anode, and finally casting the cathode on the electrolyte. Alternatively, the cathode can be cast first on the metal substrate, followed by the electrolyte, and finally the anode. The multi-layer green tape can be dried and sintered at a temperature in a range of 300° C. to 1200° C., more preferably 600° C. to 1000° C. to achieve the necessary electrochemical properties.

Tables 1, 2 and 3 below provide general formulas for slurries for casting tapes according to the present invention.

TABLE 1

Slurry for Casting Solid State Electrolyte Tape

| Component Functional Description | Weight Percentage |
| --- | --- |
| Lithium Ion Conductor | 35-65 wt % |
| Binder | 1-5 wt % |
| Dispersant - Source of Lithium Ions | 0.1-5 wt % |
| Plasticizer | 1-30 wt % |
| Sintering Aid - Source of Borate Ions | 0-5 wt % |
| Solvent | 10-55 wt % |

All weight percentages are percent by weight of the total slurry.

TABLE 2

Slurry for Casting Cathode Tape

| Component Functional Description | Weight Percentage |
| --- | --- |
| Lithium Host Material | 35-65 wt % |
| Binder | 1-5 wt % |
| Dispersant - Source of Lithium Ions | 0.1-5 wt % |
| Plasticizer | 1-30 wt % |
| Sintering Aid - Source of Borate Ions | 0-5 wt % |
| Solvent | 10-55 wt % |

All weight percentages are percent by weight of the total slurry.

TABLE 3

Slurry for Casting Anode Tape

| Component Functional Description | Weight Percentage |
| --- | --- |
| Lithium Host Material | 35-65 wt % |
| Binder | 1-5 wt % |
| Dispersant - Source of Lithium Ions | 0.1-5 wt % |
| Plasticizer | 1-30 wt % |
| Sintering Aid - Source of Borate Ions | 0-5 wt % |
| Solvent | 10-55 wt % |

All weight percentages are percent by weight of the total slurry.

In one non-limiting example embodiment, the invention provides a method for forming a lithium ion conducting solid-state electrolyte. The method includes the steps of: (a) casting a slurry on a surface to form a layer; and (b) sintering the layer to form the solid-state electrolyte, wherein the slurry comprises a solid electrolyte material and a dispersant providing a source of lithium ions. The solid electrolyte material can be selected from the group consisting of any combination oxide or phosphate materials with the garnet, perovskite, NaSICON, or LiS ICON phase. The solid electrolyte material can be selected from the group consisting of oxide materials with the garnet phase. The solid electrolyte material can have the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;
v can vary from 0-3;
w can vary from 0-2; and
y can vary from 11-12.5.

The solid electrolyte material can be a lithium lanthanum zirconium oxide. The solid electrolyte material can have the formula $Li_{6.25}La_3Zr_2Al_{0.25}O_{12}$.

In one version of the method for forming a lithium ion conducting solid-state electrolyte using a slurry comprising a solid electrolyte material and a dispersant providing a source of lithium ions, the layer can be sintered at a temperature in a range of 600° C. to 1100° C. The layer can have a thickness in a range of 10 to 100 microns. The dispersant can be selected from the group consisting of salts of lithium and a fatty acid. The fatty acid can be selected from lauric acid, myristic acid, palmitic acid, stearic acid, oleic acid, linoleic acid, linolenic acid, arachidic acid, and behenic acid. In one version of the method, the dispersant is lithium stearate. The slurry can further comprise a binder. The binder can be selected from the group consisting of non-fluorinated polymeric materials. The slurry can further comprise a plasticizer selected from the group consisting of plant oils. The plant oil can be selected from the group consisting of coconut oil, castor oil, soybean oil, palm kernel oil, almond oil, corn oil, canola oil, rapeseed oil, and mixtures thereof. The slurry can further comprise a solvent selected from the group consisting of alkanols, nitriles, alkyl carbonates, alkylene carbonates, alkyl acetates, sulfoxides, glycol ethers, ethers, N-methyl-2-pyrrolidone, dimethylformamide, dimethylacetamide, tetrahydrofuran, and mixtures thereof.

In one version of the method for forming a lithium ion conducting solid-state electrolyte using a slurry comprising a solid electrolyte material and a dispersant providing a source of lithium ions, the slurry comprises 35 wt. % to 65 wt. % of the solid electrolyte material, and 0.1 wt. % to 5 wt. % of the dispersant. The slurry may further comprise 1 wt. % to 5 wt. % of a binder. The slurry may further comprise 1 wt. % to 30 wt. % of a plasticizer. The slurry may further comprise 10 wt. % to 55 wt. % of a solvent, wherein all weight percentages (wt. %) are percent by weight of the total slurry. In one non-limiting version of the method, the slurry comprises:

40 wt. % to 60 wt. % of the solid electrolyte material wherein the solid electrolyte material comprises lithium lanthanum zirconium oxide having the formula $Li_{6.25}La_3Zr_2Al_{0.25}O_{12}$, 0.1 wt. % to 2 wt. % of the dispersant,
1 wt. % to 5 wt. % of a binder,
1 wt. % to 5 wt. % of a plasticizer,
20 wt. % to 45 wt. % of a solvent,
wherein all weight percentages (wt. %) are percent by weight of the total slurry.

In one version of the method for forming a lithium ion conducting solid-state electrolyte using a slurry comprising a solid electrolyte material and a dispersant providing a source of lithium ions, the slurry further comprises a sintering aid. The sintering aid provides a source of borate, silicate, phosphate, or aluminate ions. The sintering aid can be selected from the group consisting of boric acid, boric acid salts, boric acid esters, boron alkoxides, phosphoric acid, phosphoric acid salts, phosphate acid esters, silicic acid, silicic acid salts, silanols, silicon alkoxides, aluminum alkoxides, and mixtures thereof. The slurry may comprise up to 5 wt. % of the sintering aid, wherein all weight percentages (wt. %) are percent by weight of the total slurry.

In another non-limiting example embodiment, the invention provides a method for forming a lithium ion conducting solid-state electrolyte. The method includes the steps of: (a) casting a slurry on a surface to form a layer; and (b) sintering the layer to form the solid-state electrolyte, wherein the slurry comprises a solid electrolyte material having an excess of lithium ions. The solid electrolyte material can have the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;
v can vary from 0-3;
w can vary from 0-2; and
y can vary from 11-12.5.

The solid electrolyte material can be a lithium lanthanum zirconium oxide. The solid electrolyte material can have the formula $Li_{6.25}La_3Zr_2Al_{0.25}O_{12}$.

In one version of the method for forming a lithium ion conducting solid-state electrolyte using a slurry comprising a solid electrolyte material having an excess of lithium ions, the layer can be sintered at a temperature in a range of 600° C. to 1100° C. The layer can have a thickness in a range of 10 to 100 microns. The dispersant can be selected from the group consisting of salts of lithium and a fatty acid. The fatty acid can be selected from lauric acid, myristic acid, palmitic acid, stearic acid, oleic acid, linoleic acid, linolenic acid, arachidic acid, and behenic acid. In one version of the method, the dispersant is lithium stearate. The slurry can further comprise a binder. The binder can be selected from the group consisting of non-fluorinated polymeric materials. The slurry can further comprise a plasticizer selected from the group consisting of plant oils. The plant oil can be selected from the group consisting of coconut oil, castor oil, soybean oil, palm kernel oil, almond oil, corn oil, canola oil, rapeseed oil, and mixtures thereof. The slurry can further comprise a solvent selected from the group consisting of alkanols, nitriles, alkyl carbonates, alkylene carbonates, alkyl acetates, sulfoxides, glycol ethers, ethers, N-methyl-2-pyrrolidone, dimethylformamide, dimethylacetamide, tetrahydrofuran, and mixtures thereof.

In one version of the method for forming a lithium ion conducting solid-state electrolyte using a slurry comprising a solid electrolyte material having an excess of lithium ions, the slurry comprises 35 wt. % to 65 wt. % of the solid electrolyte material, and 0.1 wt. % to 5 wt. % of the dispersant. The slurry may further comprise 1 wt. % to 5 wt. % of a binder. The slurry may further comprise 1 wt. % to 30 wt. % of a plasticizer. The slurry may further comprise 10 wt. % to 55 wt. % of a solvent, wherein all weight percentages (wt. %) are percent by weight of the total slurry. In one non-limiting version of the method, the slurry comprises:

40 wt. % to 60 wt. % of the solid electrolyte material wherein the solid electrolyte material comprises lithium lanthanum zirconium oxide having the formula $Li_{6.25}La_3Zr_2Al_{0.25}O_{12}$, 0.1 wt. % to 2 wt. % of the dispersant, 1 wt. % to 5 wt. % of a binder, 1 wt. % to 5 wt. % of a plasticizer, 20 wt. % to 45 wt. % of a solvent, wherein all weight percentages (wt. %) are percent by weight of the total slurry.

In one version of the method for forming a lithium ion conducting solid-state electrolyte using a slurry comprising a solid electrolyte material having an excess of lithium ions, the slurry further comprises a sintering aid. The sintering aid provides a source of borate, silicate, phosphate, or aluminate ions. The sintering aid can be selected from the group consisting of boric acid, boric acid salts, boric acid esters, boron alkoxides, phosphoric acid, phosphoric acid salts, phosphate acid esters, silicic acid, silicic acid salts, silanols, silicon alkoxides, aluminum alkoxides, and mixtures thereof. The slurry may comprise up to 5 wt. % of the sintering aid, wherein all weight percentages (wt. %) are percent by weight of the total slurry.

In another non-limiting example embodiment, the invention provides a method for forming an electrode for an electrochemical device. The method includes the steps of: (a) casting a slurry on a surface to form a layer; and (b) sintering the layer to form the electrode, wherein the slurry comprises a lithium host material and a dispersant providing a source of lithium ions.

In one version of the method for forming an electrode using a slurry comprising a lithium host material and a dispersant providing a source of lithium ions, the surface is a surface of a current collector. The electrode can be a cathode for a lithium ion battery. When the electrode is a cathode for a lithium ion battery, the lithium host material may be selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. When the electrode is a cathode for a lithium ion battery, the lithium host material may be selected from the group consisting of lithium manganese nickel oxides. When the electrode is an anode for a lithium ion battery, the lithium host material may be selected from the group consisting of graphite, lithium metal, lithium titanium oxides, hard carbon, tin/cobalt alloy, or silicon/carbon. When the electrode is an anode for a lithium ion battery, the lithium host material may be selected from the group consisting of lithium titanium oxides.

In one version of the method for forming an electrode using a slurry comprising a lithium host material and a dispersant providing a source of lithium ions, the layer is sintered at a temperature in a range of 600° C. to 1100° C. The layer can have a thickness in a range of 10 to 100 microns.

In one version of the method for forming an electrode using a slurry comprising a lithium host material and a dispersant providing a source of lithium ions, the dispersant is selected from the group consisting of salts of lithium and a fatty acid. The fatty acid can be selected from lauric acid, myristic acid, palmitic acid, stearic acid, oleic acid, linoleic acid, linolenic acid, arachidic acid, and behenic acid. The dispersant can be lithium stearate. The slurry can further comprise a binder. The binder can be selected from the group consisting of non-fluorinated polymeric materials. The slurry can further comprise a plasticizer selected from the group consisting of plant oils. The plant oil can be selected from the group consisting of coconut oil, castor oil, soybean oil, palm kernel oil, almond oil, corn oil, canola oil, rapeseed oil, and mixtures thereof. The slurry can further comprise a solvent selected from the group consisting of alkanols, nitriles, alkyl carbonates, alkylene carbonates, alkyl acetates, sulfoxides, glycol ethers, ethers, N-methyl-2-pyrrolidone, dimethylformamide, dimethylacetamide, tetrahydrofuran, and mixtures thereof.

In one version of the method for forming an electrode using a slurry comprising a lithium host material and a dispersant providing a source of lithium ions, the slurry comprises: 35 wt. % to 65 wt. % of the lithium host material, and 0.1 wt. % to 5 wt. % of the dispersant. The slurry can further comprise 1 wt. % to 5 wt. % of a binder. The slurry can further comprise 1 wt. % to 30 wt. % of a plasticizer. The slurry can further comprise 10 wt. % to 55 wt. % of a solvent. The slurry may comprise 40 wt. % to 60 wt. % of the lithium host material, 0.1 wt. % to 2 wt. % of the dispersant, 1 wt. % to 5 wt. % of a binder, 1 wt. % to 5 wt. % of a plasticizer, and 20 wt. % to 45 wt. % of a solvent, wherein all weight percentages (wt. %) are percent by weight of the total slurry.

In one version of the method for forming an electrode using a slurry comprising a lithium host material and a dispersant providing a source of lithium ions, the slurry further comprises a sintering aid. The sintering aid provides a source of borate, silicate, phosphate, or aluminate ions. The sintering aid can be selected from the group consisting of boric acid, boric acid salts, boric acid esters, boron alkoxides, phosphoric acid, phosphoric acid salts, phosphate acid esters, silicic acid, silicic acid salts, silanols, silicon alkoxides, aluminum alkoxides, and mixtures thereof. The slurry may comprise up to 5 wt. % of the sintering aid, wherein all weight percentages (wt. %) are percent by weight of the total slurry.

In another non-limiting example embodiment, the invention provides a method for forming an electrochemical device. The method includes the steps of: (a) casting a first slurry on a surface to form a first layer, wherein the first slurry comprises a first lithium host material; (b) casting a second slurry on the first layer to form a second layer on the first layer, wherein the second slurry comprises a solid electrolyte material and a dispersant providing a source of lithium ions; (c) casting a third slurry on the second layer to form a third layer on the second layer thereby creating a layered structure of the first layer, the second layer and the third layer, wherein the third slurry comprises a second lithium host material; and (d) sintering the layered structure to form the electrochemical device. The sintered first layer of the sintered layered structure can be one of the anode and the cathode of the electrochemical device, and the sintered third layer of the sintered layered structure can be the other of the anode and the cathode of the electrochemical device. The sintered second layer of the sintered layered structure can be the solid state electrolyte between the anode and cathode of the electrochemical device. The casting surface of the first slurry can be a surface of a current collector of the electrochemical device.

In another non-limiting example embodiment, the invention provides a method for forming an electrochemical device. The method includes the steps of: (a) casting a first slurry on a surface to form a first layer, wherein the first slurry comprises a first lithium host material; (b) casting a second slurry on the first layer to form a second layer on the first layer, wherein the second slurry comprises a solid electrolyte material having an excess of lithium ions; (c) casting a third slurry on the second layer to form a third layer on the second layer thereby creating a layered structure of the first layer, the second layer and the third layer, wherein the third slurry comprises a second lithium host material; and (d) sintering the layered structure to form the electrochemical device. The sintered first layer of the sintered layered structure can be one of the anode and the cathode of the electrochemical device, and the sintered third layer of the sintered layered structure can be the other of the anode and the cathode of the electrochemical device. The sintered second layer of the sintered layered structure can be the solid state electrolyte between the anode and cathode of the electrochemical device. The casting surface of the first slurry can be a surface of a current collector of the electrochemical device.

In the methods for forming an electrochemical device in which a layered structure of the first layer, the second layer and the third layer is sintered, the first lithium host material can be selected from (i) a first group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel, and (ii) a second group consisting of graphite, lithium metal, lithium titanium oxides, hard carbon, tin/cobalt alloy, or silicon/carbon, wherein the second lithium host material is selected from the second group when the first lithium host material is selected from the first group, and the second lithium host material is selected from the first group when the first lithium host material is selected from the second group. The surface can be a surface of a current collector.

In the methods for forming an electrochemical device in which a layered structure of the first layer, the second layer and the third layer is sintered, the sintering of the layered structure can be at a temperature in a range of 600° C. to 1100° C. The first layer can have as a thickness in a range of 10 to 100 microns, and the second layer can have a thickness in a range of 10 to 100 microns, and the third layer can have a thickness in a range of 10 to 100 microns.

In the methods for forming an electrochemical device in which a layered structure of the first layer, the second layer and the third layer is sintered, the first slurry and/or the second slurry and/or the third slurry can each comprise a plasticizer selected from the group consisting of plant oils. The first slurry and/or the second slurry and/or the third slurry can each comprise a binder selected from the group consisting of non-fluorinated polymeric materials. The first slurry and/or the second slurry and/or the third slurry can each comprise a sintering aid providing a source of borate, silicate, phosphate, or aluminate ions. The dispersant can be selected from the group consisting of salts of lithium and a fatty acid.

In the methods for forming an electrochemical device in which a layered structure of the first layer, the second layer and the third layer is sintered, the solid electrolyte material can have the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2; and y can vary from 11-12.5.

The solid electrolyte material can be a lithium lanthanum zirconium oxide. The solid electrolyte material can have the formula $Li_{6.25}La_3Zr_2Al_{0.25}O_{12}$.

In another non-limiting example embodiment, the invention provides a slurry for forming a lithium ion conducting solid-state electrolyte. The slurry comprises a solid electrolyte material, and a dispersant providing a source of lithium ions. The slurry can be sintered to form a ceramic layer suitable for use as a lithium ion conducting solid-state electrolyte in an electrochemical device, such as a lithium ion solid state battery.

In one example version of the slurry for forming a lithium ion conducting solid-state electrolyte, the solid electrolyte material is selected from the group consisting of any combination oxide or phosphate materials with the garnet, perovskite, NaSICON, or LiSICON phase. The solid electrolyte material can be selected from the group consisting of oxide materials with the garnet phase. The solid electrolyte material can have the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2; and y can vary from 11-12.5.

The solid electrolyte material can be a lithium lanthanum zirconium oxide. The solid electrolyte material can have the formula $Li_{6.25}La_3Zr_2Al_{0.25}O_{12}$.

In one example version of the slurry for forming a lithium ion conducting solid-state electrolyte, the dispersant is selected from the group consisting of salts of lithium and a fatty acid. The fatty acid can be selected from lauric acid, myristic acid, palmitic acid, stearic acid, oleic acid, linoleic acid, linolenic acid, arachidic acid, and behenic acid. The dispersant can be lithium stearate. The slurry can further comprise a binder. The binder can be selected from the group consisting of non-fluorinated polymeric materials. The slurry can further comprise a plasticizer selected from the group consisting of plant oils. The plant oil can be selected from the group consisting of coconut oil, castor oil, soybean oil, palm kernel oil, almond oil, corn oil, canola oil, rapeseed oil, and mixtures thereof. The slurry can further comprise a solvent selected from the group consisting of alkanols, nitriles, alkyl carbonates, alkylene carbonates, alkyl acetates, sulfoxides, glycol ethers, ethers, N-methyl-2-pyrrolidone, dimethylformamide, dimethylacetamide, tetrahydrofuran, and mixtures thereof.

In one example version of the slurry for forming a lithium ion conducting solid-state electrolyte, the slurry comprises 35 wt. % to 65 wt. % of the solid electrolyte material, and 0.1 wt. % to 5 wt. % of the dispersant. The slurry may further comprise 1 wt. % to 5 wt. % of a binder. The slurry may further comprise 1 wt. % to 30 wt. % of a plasticizer. The slurry may further comprise 10 wt. % to 55 wt. % of a solvent, wherein all weight percentages (wt. %) are percent by weight of the total slurry.

In one example version of the slurry for forming a lithium ion conducting solid-state electrolyte, the slurry comprises:
40 wt. % to 60 wt. % of the solid electrolyte material wherein the solid electrolyte material is a lithium lanthanum zirconium oxide having the formula $Li_{6.25}La_3Zr_2Al_{0.25}O_{12}$,
0.1 wt. % to 2 wt. % of the dispersant,
1 wt. % to 5 wt. % of a binder,
1 wt. % to 5 wt. % of a plasticizer,
20 wt. % to 45 wt. % of a solvent,
wherein all weight percentages (wt. %) are percent by weight of the total slurry.

In one example version of the slurry for forming a lithium ion conducting solid-state electrolyte, the slurry further comprises a sintering aid providing a source of borate, silicate, phosphate, or aluminate ions. The slurry may comprise up to 5 wt. % of the sintering aid, wherein all weight percentages (wt. %) are percent by weight of the total slurry.

In another non-limiting example embodiment, the invention provides a slurry for forming an electrode for an electrochemical device. The slurry comprises a lithium host material, and a dispersant providing a source of lithium ions. The slurry can be sintered to form a ceramic layer suitable for use as an anode or cathode in an electrochemical device, such as a lithium ion solid state battery.

In one example version of the slurry for forming an electrode, the dispersant is selected from the group consisting of salts of lithium and a fatty acid. The fatty acid can be selected from lauric acid, myristic acid, palmitic acid, stearic acid, oleic acid, linoleic acid, linolenic acid, arachidic acid, and behenic acid. The dispersant can be lithium stearate. The slurry can further comprise a binder. The binder can be selected from the group consisting of non-fluorinated polymeric materials. The slurry can further comprise a plasticizer selected from the group consisting of plant oils. The plant oil can be selected from the group consisting of coconut oil, castor oil, soybean oil, palm kernel oil, almond oil, corn oil, canola oil, rapeseed oil, and mixtures thereof. The slurry can further comprise a solvent selected from the group consisting of alkanols, nitriles, alkyl carbonates, alkylene carbonates, alkyl acetates, sulfoxides, glycol ethers, ethers, N-methyl-2-pyrrolidone, dimethylformamide, dimethylacetamide, tetrahydrofuran, and mixtures thereof.

In one example version of the slurry for forming an electrode, the slurry comprises 35 wt. % to 65 wt. % of the lithium host material, and 0.1 wt. % to 5 wt. % of the dispersant. The slurry may further comprise 1 wt. % to 5 wt. % of a binder. The slurry may further comprise 1 wt. % to 30 wt. % of a plasticizer. The slurry may further comprise 10 wt. % to 55 wt. % of a solvent, wherein all weight percentages (wt. %) are percent by weight of the total slurry. In one example version of the slurry for forming an electrode, the slurry comprises: 40 wt. % to 60 wt. % of the lithium host material, 0.1 wt. % to 2 wt. % of the dispersant, 1 wt. % to 5 wt. % of a binder, 1 wt. % to 5 wt. % of a plasticizer, 20 wt. % to 45 wt. % of a solvent, wherein all weight percentages (wt. %) are percent by weight of the total slurry.

In one example version of the slurry for forming an electrode, the slurry further comprises a sintering aid providing a source of borate, silicate, phosphate, or aluminate ions. The slurry may comprise up to 5 wt. % of the sintering aid, wherein all weight percentages (wt. %) are percent by weight of the total slurry.

In one example version of the slurry for forming an electrode, the lithium host material is selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. The lithium host material can be selected from the group consisting of lithium manganese nickel oxides. The lithium host material can be selected from the group consisting of graphite, lithium metal, lithium titanium oxides, hard carbon, tin/cobalt alloy, or silicon/carbon. The lithium host material can be selected from the group consisting of lithium titanium oxides.

EXAMPLES

The following Examples have been presented in order to further illustrate the invention and are not intended to limit the invention in any way.

Example 1

Slurries were prepared using the formulas of Tables 4, 5 and 6 below.

TABLE 4

Slurry for Casting Solid State Electrolyte Tape

| Component Description | Functional Description | Grams | Weight Percentage |
|---|---|---|---|
| $Li_{6.25}La_3Zr_2Al_{0.25}O_{12}$ (LLZO) | Lithium Ion Conductor | 9 | 55.3 wt % |
| Poly(methyl methacrylate) | Binder | 0.7 | 4.3 wt % |
| Lithium stearate | Dispersant - Source of Lithium Ions | 0.1 | 0.6 wt % |
| Coconut oil | Plasticizer | 0.2 | 1.2 wt % |
| Ethanol and acetonitrile | Solvent | 6.288 | 38.6 wt % |

All weight percentages are percent by weight of the total slurry.

TABLE 5

Slurry for Casting Cathode Tape

| Component Description | Functional Description | Grams | Weight Percentage |
|---|---|---|---|
| Lithium Manganese Nickel Oxide high voltage spinel | Lithium Host Material | 8.1 | 53.0 wt % |
| Poly(methyl methacrylate) | Binder | 0.63 | 4.1 wt % |
| Lithium stearate | Dispersant - Source of Lithium Ions | 0.09 | 0.6 wt % |
| Coconut oil | Plasticizer | 0.18 | 1.2 wt % |
| Ethanol and acetonitrile | Solvent | 6.288 | 41.1 wt % |

All weight percentages are percent by weight of the total slurry.

TABLE 6

Slurry for Casting Anode Tape

| Component Description | Functional Description | Grams | Weight Percentage |
|---|---|---|---|
| Lithium Titanium Oxide spinel | Lithium Host Material | | 47.4 wt % |
| Poly(methyl methacrylate) | Binder | | 3.7 wt % |
| Lithium stearate | Dispersant - Source of Lithium Ions | | 0.5 wt % |
| Coconut oil | Plasticizer | | 1.1 wt % |
| Ethanol and acetonitrile | Solvent | | 47.3 wt % |

All weight percentages are percent by weight of the total slurry.

Figure 2:
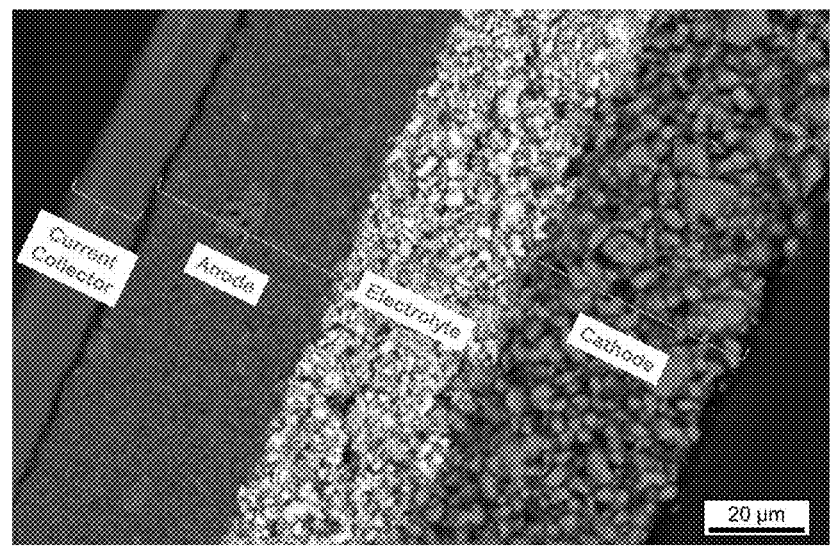
FIG. 2 is a scanning electron microscope (SEM) image showing three cast layers (anode, electrolyte and cathode) cast one on top of another using an example method of the invention.
Figure 3:
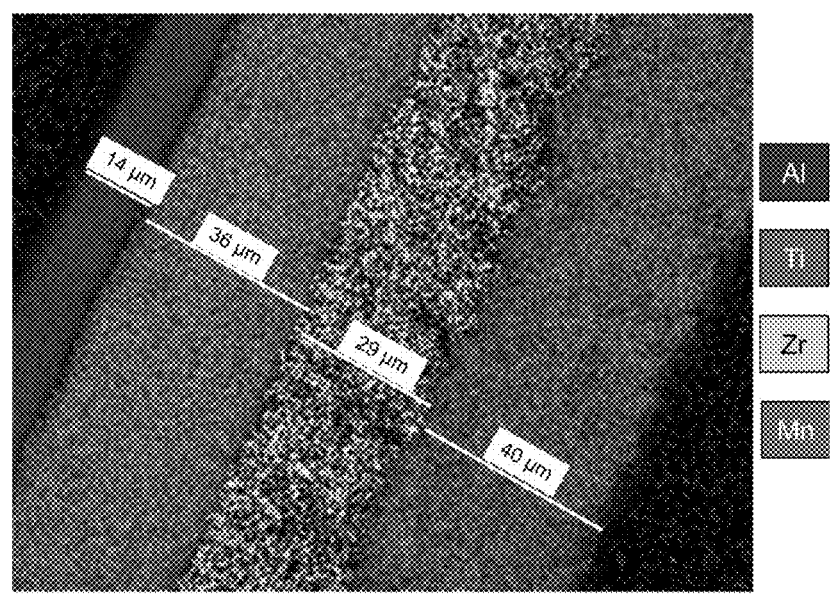
FIG. 3 is an SEM image showing an elemental map of three slurry layers (anode, electrolyte, and cathode) cast sequentially on top of an aluminum current collector as in FIG. 2.
Figure 4:
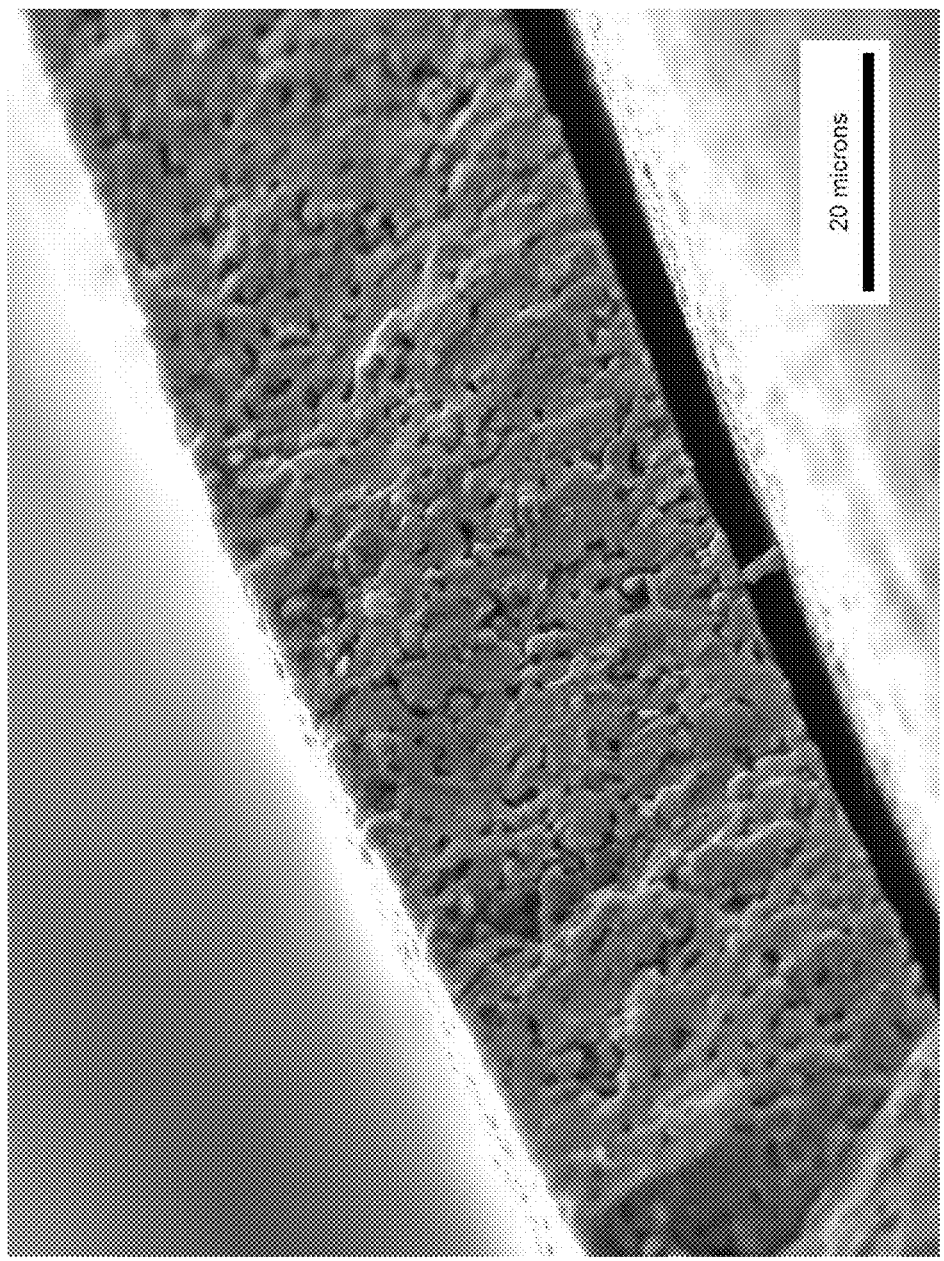
FIG. 4 is an SEM image showing a cast layer of LLZO solid electrolyte which has been subsequently sintered to achieve high density.

After preparation of the slurries of Tables 4, 5, and 6, the slurry for casting anode tape (Table 6) was cast using a blade on a 14 micrometer thick aluminum substrate. The slurry for casting solid state electrolyte tape (Table 4) was then cast using a blade on the anode tape layer. The slurry for casting cathode tape (Table 5) was then cast using a blade on the solid state electrolyte tape layer. FIG. 2 is a scanning electron microscope (SEM) image showing the three cast layers (anode, solid electrolyte and cathode) cast one on top of another. FIG. 3 is an SEM image showing an elemental map of three slurry layers (anode—36 μm thick, electrolyte—29 μm thick, and cathode—40 μm thick) cast sequentially on top of the aluminum current collector—14 μm thick. Sintering of this structure would result in the formation of a solid state battery cell with ~2.5 mAhr/cm$^2$ of loading and an energy density of 155 Whr/kg and 640 Whr/L. The Al corresponds to the current collector, the Ti corresponds to the anode, the Zr corresponds to the solid electrolyte, and the Mn corresponds to the cathode. FIGS. 2 and 3 are examples of the slurry formulation used to cast layers of battery materials and show the viability of the slurry formulation for a solid state battery as described herein. FIG. 4 is an SEM image showing a cast layer of LLZO solid electrolyte which has been subsequently sintered to achieve high density.

Thus, the invention provides electrochemical devices, such as lithium ion battery electrodes, lithium ion conducting solid-state electrolytes, and solid-state lithium ion batteries including these electrodes and solid-state electrolytes. This invention also provides to methods for making such electrochemical devices. This technology allows for solid-state lithium ion batteries that are non-flammable and do not require hermetic packaging while offering improved performance. The solid-state electrolytes of the invention may also be suitable for use in a solid-state lithium-air battery.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A slurry for forming a lithium ion conducting solid-state electrolyte, the slurry comprising:
   a solid electrolyte material, wherein the solid electrolyte material undergoes a loss of lithium during sintering of the solid electrolyte material, and
   a dispersant providing a source of lithium ions to address the loss of lithium during sintering.

2. The slurry of claim 1 wherein:
   the solid electrolyte material is selected from the group consisting of any combination oxide or phosphate materials with the garnet, perovskite, NaSICON, or LiSICON phase.

3. The slurry of claim 1 wherein:
   the solid electrolyte material is selected from the group consisting of oxide materials with the garnet phase.

4. The slurry of claim 1 wherein:
   the solid electrolyte material has the formula $Li_uRe_vM_wA_xO_y$, wherein
   Re can be any combination of elements with a nominal valance of +3 including La, Nd, Pr, Pm, Sm, Sc, Eu, Gd, Tb, Dy, Y, Ho, Er, Tm, Yb, and Lu;
   M can be any combination of metals with a nominal valance of +3, +4, +5 or +6 including Zr, Ta, Nb, Sb, W, Hf, Sn, Ti, V, Bi, Ge, and Si;
   A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;
   u can vary from 3-7.5;
   v can vary from 0-3;
   w can vary from 0-2; and
   y can vary from 11-12.5.

5. The slurry of claim 1 wherein:
   the solid electrolyte material comprises lithium lanthanum zirconium oxide.

6. The slurry of claim 1 wherein the slurry comprises:
   35 wt. % to 65 wt. % of the solid electrolyte material, and
   0.1 wt. % to 5 wt. % of the dispersant,
   wherein all weight percentages are percent by weight of the total slurry.

7. The slurry of claim 1 wherein the slurry comprises:
   40 wt. % to 60 wt. % of the solid electrolyte material wherein the solid electrolyte material comprises lithium lanthanum zirconium oxide having the formula $Li_{6.25}La_3Zr_2Al_{0.25}O_{12}$,
   0.1 wt. % to 2 wt. % of the dispersant,
   1 wt. % to 5 wt. % of a binder,
   1 wt. % to 5 wt. % of a plasticizer,
   20 wt. % to 45 wt. % of a solvent,
   wherein all weight percentages are percent by weight of the total slurry.

8. The slurry of claim 1 wherein:
   the slurry further comprises 1 wt. % to 5 wt. % of a binder, wherein all weight percentages are percent by weight of the total slurry.

9. The slurry of claim 8 wherein:
   the binder is selected from the group consisting of non-fluorinated polymeric materials.

10. The slurry of claim 1 wherein:
    the slurry further comprises a sintering aid, and
    lithium ions from the source of lithium ions react with the sintering aid.

11. The slurry of claim 10 wherein:
    the slurry comprises up to 5 wt. % of the sintering aid, wherein all weight percentages are percent by weight of the total slurry.

12. The slurry of claim 10 wherein:
    the sintering aid provides a source of borate, silicate, phosphate, or aluminate ions.

13. The slurry of claim 10 wherein:
    the sintering aid provides a source of borate ions.

14. The slurry of claim 1 wherein:
    the solid electrolyte material comprises particles, and the dispersant stabilizes the slurry and prevents suspended solid electrolyte material particles from settling out of the slurry.

15. A slurry for forming a lithium ion conducting solid-state electrolyte, the slurry comprising:
  a solid electrolyte material, wherein the solid electrolyte material undergoes a loss of lithium during sintering of the solid electrolyte material, and
  a dispersant providing a source of lithium ions to address the loss of lithium during sintering,
  wherein the dispersant comprises a lithium salt of a fatty acid.

16. The slurry of claim 15 wherein:
  the fatty acid is selected from lauric acid, myristic acid, palmitic acid, stearic acid, oleic acid, linoleic acid, linolenic acid, arachidic acid, and behenic acid.

17. The slurry of claim 15 wherein:
  the dispersant is lithium stearate.

18. A slurry for forming a lithium ion conducting solid-state electrolyte, the slurry comprising:
  a solid electrolyte material, wherein the solid electrolyte material undergoes a loss of lithium during sintering of the solid electrolyte material, and
  a dispersant providing a source of lithium ions to address the loss of lithium during sintering,
  wherein the slurry further comprises 1 wt. % to 30 wt. % of a plasticizer, wherein all weight percentages are percent by weight of the total slurry, and
  the plasticizer is selected from the group consisting of plant oils.

19. The slurry of claim 18 wherein:
  the plant oil is selected from the group consisting of coconut oil, castor oil, soybean oil, palm kernel oil, almond oil, corn oil, canola oil, rapeseed oil, and mixtures thereof.

\* \* \* \* \*

UNITED STATES PATENT AND TRADEMARK OFFICE
CERTIFICATE OF CORRECTION

PATENT NO. : 11,973,182 B2
APPLICATION NO. : 16/914792
DATED : April 30, 2024
INVENTOR(S) : Jeffrey Sakamoto et al.

Page 1 of 1

It is certified that error appears in the above-identified patent and that said Letters Patent is hereby corrected as shown below:

In the Specification

Column 2, Line 17, "NaS ICON" should be --NaSICON--.

Column 9, Line 1, "LiS ICON" should be --LiSICON--.

Signed and Sealed this
Thirtieth Day of July, 2024

Katherine Kelly Vidal
*Director of the United States Patent and Trademark Office*